United States Patent [19]
Yoneda et al.

[11] Patent Number: 4,564,607
[45] Date of Patent: Jan. 14, 1986

[54] HETEROPOLYACID-TYPE CATALYST COMPOSITION CONTAINING WHISKERS

[75] Inventors: Tadahiro Yoneda, Ibaraki; Michio Ueshima, Nishinomiya, both of Japan

[73] Assignee: Nippon Shokubai Kagaku Kogyo Co. Ltd., Osaka, Japan

[21] Appl. No.: 591,835

[22] Filed: Mar. 21, 1984

[30] Foreign Application Priority Data

Mar. 24, 1983 [JP] Japan .................................. 58-47871
Apr. 1, 1983 [JP] Japan .................................. 58-55150

[51] Int. Cl.⁴ ........................ B01J 27/20; B01J 27/14; B01J 23/84; B01J 23/08
[52] U.S. Cl. .................................... 502/209; 502/177; 502/178; 502/211; 502/306; 502/355; 502/527
[58] Field of Search ............... 502/177, 178, 355, 306, 502/527, 209, 211

[56] References Cited

U.S. PATENT DOCUMENTS

| | | | |
|---|---|---|---|
| 3,614,809 | 10/1971 | Hayes et al. | 502/527 X |
| 3,900,306 | 8/1975 | Brueggemann et al. | 502/527 X |
| 3,907,532 | 9/1975 | Roberts | 502/527 X |
| 3,931,441 | 1/1976 | Milewski | 502/527 X |
| 3,972,834 | 8/1976 | Washbourne | 502/527 X |
| 4,140,654 | 2/1979 | Yoshioka et al. | 502/527 X |
| 4,192,951 | 3/1980 | Slinkard et al. | 502/209 X |
| 4,238,359 | 12/1980 | Akiyama et al. | 502/209 |
| 4,279,782 | 7/1981 | Chapman et al. | 502/314 |
| 4,318,828 | 3/1982 | Chapman | 502/314 |
| 4,331,631 | 5/1982 | Chapman et al. | 502/439 X |
| 4,335,018 | 6/1982 | Franz et al. | 502/211 X |
| 4,364,844 | 12/1982 | Umemura et al. | 502/209 |
| 4,364,857 | 12/1982 | Santilli | 502/527 X |
| 4,399,185 | 8/1983 | Petrow | 502/527 X |
| 4,419,270 | 12/1983 | Ueshima et al. | 502/209 |

FOREIGN PATENT DOCUMENTS

| | | | |
|---|---|---|---|
| 53-63293 | 6/1978 | Japan | 502/178 |
| 54-20983 | 2/1979 | Japan | 502/178 |

Primary Examiner—D. E. Gantz
Assistant Examiner—William G. Wright
Attorney, Agent, or Firm—Sherman & Shalloway

[57] ABSTRACT

A catalyst composition having excellent mechanical strength comprising a compound containing a heteropolyacid as a base and whiskers.

8 Claims, No Drawings

HETEROPOLYACID-TYPE CATALYST COMPOSITION CONTAINING WHISKERS

This invention relates to a heteropolyacid-type catalyst. More specifically, it relates to a catalyst composition which comprises a heteropolyacid-type catalytically active ingredient based on molybdophosphoric or molybdovanadophosphoric acid as a base and whiskers, has excellent mechanical strengths (e.g., compressive strength, abrasion resistance and falling strength) in industrial use, and exhibits an excellent catalytic performance in the production of methacrylic acid by the oxidation or oxidative dehydrogenation of methacrolein, isobutyraldehyde or isobutyric acid in the vapor phase.

It has been known to use inorganic fibers or whiskers as a catalyst carrier. In the prior art, glass fibers, asbestos or whiskers are used as means for highly dispersing catalytically active substances, namely as a carrier. In the present invention, however, whiskers are used not as a carrier but as a minor component to be added to a catalytically active substance containing a heteropolyacid as a base.

Many compounds containing phosphorus-molybdenum or phosphorus-molybdenum-vanadium as a base have been reported heretofore as catalysts for the production of methacrylic acid by the catalytic vapor-phase oxidation of methacrolein, isobutyraldehyde or isobutyric acid. However, phosphorus-molybdenum or phosphorus-molybdenum-vanadium assumes a heteropolyacid structure as molybdophosphoric acid or molybdovanadophosphoric acid, and catalysts containing such a heteropolyacid as a base have the defect of very poor moldability. Various investigations have therefore been made about the form and mechanical strength of these catalysts in order to make them industrially feasible.

Generally, catalysts are in the form of supported catalysts prepared by depositing catalyst ingredients on suitable carriers, compression-molded catalysts prepared by a tableting method or an extruding method, and granular catalysts prepared by a rolling granulating method. Which of such forms is to be selected is determined by an overall consideration of the nature of a given catalytically active substance and the required catalytic performance and mechanical strength. In any of these forms, however, catalysts having such high mechanical strength as to fully withstand industrial use are extremely difficult to prepare from compounds containing heteropolyacid-type compounds as a base, and various improvements have been suggested.

For example, U.S. Pat. No. 4,364,844 discloses a catalyst having improved mechanical strength prepared by supporting a composition comprising phosphorus-molybdenum-vanadium and an alkali metal element on a heat-resistant inorganic material. Investigations of the present inventors have shown, however, that a compound containing a heteropolyacid compound as a base has poor adhesion to a carrier, and the ratio of adhesion is low. In order to impart some degree of mechanical strength, the amount of the heteropolyacid-type compound to be deposited is naturally limited, and consequently, the resulting catalyst tends to have insufficient activity.

Generally, a supported catalyst has the advantage that when used in a catalytic vapor-phase reaction, it inhibits both heat generation in a catalyst bed and consecutive reactions of the desired product. The reaction temperature, however, should be elevated in order to maintain its sufficient catalytic activity, and consequently, the elevated temperature tends to adversely affect the life of the catalyst.

When a catalytic substance is compression-molded by tableting or extrusion, the surface area, the pore volume, etc. of the catalyst change and may result in an undesirable phenomenon of reduction in catalytic performance.

Furthermore, since the compound containing a heteropolyacid compound as a base is difficult to mold as stated hereinabove, molding it without using molding aids, a bonding agent, etc. does not produce a catalyst having sufficient mechanical strength. In addition, when prepared by a molding method which imparts strength (by elevating the molding pressure or adding molding aids, a bonding agent, etc.), molded catalysts generally decrease in catalytic performance.

As a method of solving these problems of molded catalysts, U.S. Pat. No. 4,238,359 discloses that a catalyst having strength without a reduction in performance can be obtained by adding a volatile substance or a finely divided carrier to a composition comprising phosphorus-molybdenum and another metallic element and molding the mixture while defining the surface area and pore volume of the catalyst within preferred ranges.

Those skilled in the art may expect that if a catalyst composition is extrusion-molded in admixture with heat-resistant fibers such as glass fibers and ceramic fibers, a molded catalyst having high mechanical strength will be obtained. Investigations of the present inventors, however, have shown that the application of these methods to compounds containing heteropolyacids as a base cannot give catalysts which simultaneously have excellent catalytic performance and mechanical strength.

U.S. Pat. No. 4,419,270 discloses that a catalyst having hiqh mechanical strength and properties suitable for industrial use is obtained by extrusion-molding a catalyst containing a heteropolyacid compound as a base in the presence of a nitrogen-containing heterocyclic organic compound such as pyridine, piperidine or piperazine. Since, however, this technique is limited to the production of extrusion-molded catalysts and it is difficult to form catalysts in other forms such as a ring-shaped catalyst or a supported catalyst, it is not entirely satisfactory in industrial practice.

It is an object of this invention to improve the various prior techniques described above, and to provide a catalyst which can be produced industrially and can be actually used in industrial practice.

According to this invention, there is provided a catalyst composition comprising a compound containing a heteropolyacid as a base, preferably molybdophosphoric acid or molybdovanadophosphoric acid, and whiskers, preferably whiskers having an average diameter of not more than 5 microns and an average length of not more than 1000 microns.

A catalyst prepared by extrusion-molding a mixture of a compound containing a heteropolyacid as a base and whiskers in accordance with one embodiment of this invention has excellent compressive strength, abrasion resistance and falling strength which can hardly be imagined from a catalyst composed solely of a heteropolyacid-type compound. When this catalyst is used in the catalytic vapor-phase reaction of methacrolein, isobutyraldehyde or isobutyric acid, no decrease in activity and methacrylic acid selectivity is observed, and its activity rather increases. While it has been thought that a catalyst molded in a ring-like shape by the extrusion molding method generally has low mechanical strength, the ring-shaped catalyst in accordance with this invention has no problem in regard to its mechanical strength. In addition, it has the advantage that methacrylic acid selectivity increases.

When a supported catalyst is prepared by spraying a slurry of a mixture of a compound containing a heteropolyacid as a base and whiskers onto a suitable carrier in accordance with another embodiment of this invention, the yield of the catalytically active substance deposited on the carrier is greatly increased, and the catalyst has unexpectedly high abrasion strength. In addition, it is surprising that when this catalyst is used in the same vapor-phase reaction as mentioned above with regard to the molded catalyst, both its activity and selectivity are increased.

Thus, the present invention provides catalysts which are very advantageous industrially for the production of methacrylic acid by catalytic vapor-phase reaction.

The form of the catalyst of this invention is not limited to the extrusion-molded catalyst and supported catalyst described above, and can be properly determined by an overall consideration of the ease, yield reproducibility of actual catalyst preparation, and the desired properties of the catalyst. Accordingly, the tableting method, rolling granulating method, marmerizer molding method, etc. which are generally known can also be employed in preparing the catalyst of this invention.

Whiskers are generally defined as monocrystalline fibers having a diameter of not more than 200 microns and an aspect ratio (length-to-diameter ratio) of at least 10. In recent years, however, they have gained broad interpretation, and include polycrystalline fibers as well. In the present invention, whiskers having an average diameter of not more than 5 microns and an average length of not more than 1000 microns are preferably used.

The material for the whiskers used in this invention is not limited to metals, and may be a refractory. Specific examples include tungsten, iron, nickel, silicon carbide, boron carbide, titanium carbide, silicon nitride, silica-alumina, alumina, titanium oxide, beryllium oxide, potassium titanate, and calcium phosphate. Whiskers made from the above materials can be suitably used in this invention so long as they remain as whiskers in the final catalyst composition of this invention.

Investigations of the present inventors have shown that the shape of the whiskers (particularly their diameter and length) subtly affect the mechanical strength of the final catalyst, and a tremendous improvement in mechanical strength is achieved when the whiskers have an average particle diameter of not more than 5 microns, preferably not more than 1 micron, and a length of not more than 1000 microns, preferably not more than 500 microns. The whiskers exhibit their effect when used in a small amount, but their suitable amount differs slightly depending upon their type or the shape of the catalyst. Usually, the whiskers can be included in an amount of 1 to 50% by weight based on the catalyst ingredients. Much is left unknown about the cause of the effect achieved by the use of the whiskers, but theoretically, the following may possibly be the cause.

The size of the particles of the compound containing a heteropolyacid as a base differs somewhat depending upon the preparing conditions. But generally, they are observed as spherical or block-like particles having a size of less than about 1 micron. Accordingly, the whiskers are more effectively dispersed as they have a smaller diameter or to some exent a shorter length. Furthermore, even when the amount of the whiskers is small, they mechanically well match the particles of the heteropolyacid-type compound, and this will result in a striking increase in the physical strength of the catalyst. Furthermore, by the dispersing effect mentioned above, the volume of spaces in the catalytically active substance layer increases to provide good air-permeability. This will produce an effect of removing heat during the reaction and inhibiting the occurrence of consecutive reactions, and result in an increase in activity and selectivity.

The compound containing a heteropolyacid as a base may be any compound composed mainly of a heteropolyacid compound such as molybdophosphoric acid, molybdovanadophosphoric acid and metal salts of these acids. To produce methacrylic acid in a high yield, however, it is preferably a compound having the composition of the following general formula

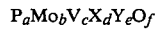
$$P_aMo_bV_cX_dY_eO_f$$

wherein P represents phosphorus, Mo represents molybdenum, V represents vanadium, X represents at least one element selected from alkali metals and alkaline earth metals, Y represents at least one element selected from copper, silver, arsenic, antimony, tellurium, cobalt, bismuth, tungsten and zirconium, and O represents oxygen; the subscripts a, b, c, d, e and f represent the atomic ratios of the elements, and when b is 12,
a is 0.1 to 3.0, preferably 0.5 to 1.5,
c is 0 to 6.0, preferably 0.1 to 2.5,
d is 0.05 to 5.0, preferably 0.1 to 2.0,
e is 0.01 to 5.0, preferably 0.05 to 2.0, and
f is a number determined by the atomic numbers and atomic ratios of the individual elements.

Various materials for the catalyst can be used. For example, orthophosphoric acid, disodium hydrogen phosphate, monoammonium phosphate and diammonium phosphate are used as phosphorus compounds. Molybdenum compounds include, for example, molybdenum trioxide, molybdic acid, sodium molybdate, ammonium paramolybdate and phosphomolybdic acid. Examples of vanadium compounds include vanadium pentoxide, ammonium metavanadate, sodium metavanadate, vanadyl oxalate and vanadyl sulfate. As the X and Y components, the hydroxides, nitrates, sulfates, carbonates, halides, ammonium salts, oxy acids, etc. of the elements described above for these components may be used.

A detailed description will now be made of methods for preparing the extrusion-molded catalyst and the supported catalysts in the preferred embodiments of the catalyst composition of this invention.

(1) Extrusion-molded catalysts

To prepare the extrusion-molded catalyst, all known methods of prepa ing catalysts based on phosphorus-molybdenum or phosphorus-molybdenum-vanadium can be used. For example, to an aqueous solution prepared in advance of molybdophosphoric acid or molybdovanadophosphoric acid, an aqueous solution of compounds of the other required elements is added to form a slurry. Whiskers in a suitable amount are added to the slurry, and the slurry is evaporated to dryness. The dried product is pulverized to make a powder of a heteropolyacid compound containing the whiskers. Or compounds of phosphorus, molybdenum, vanadium and other required additive metal elements are added to water to form a slurry, and whiskers are added in a suitable amount. The slurry is evaporated to dryness and pulverized to form a powder containing the whiskers. A small amount of water is added to the resulting powder and well mixed. It is then molded, for example, into a solid cylindrical form having a diameter of 5.5 mm and a length of 6 mm, or a ring having an outside diameter of 5.5 mm, an inside diameter of 2.0 mm and a length of 6 mm by an extrusion-molding machine. The molded catalyst is dried, and calcined at 350° to 400° C. in the presence of air.

When the extrusion-molded catalyst of this invention is prepared by utilizing the method for preparing a catalyst using a nitrogen-containing organic compound described above (U.S. Pat. No. 4,419,270), a step of removing this organic compound is provided before the calcination step. This step can be carried out by heat-treating the molded catalyst at a temperature of 200° to 600° C. in an atmosphere of an inert gas such as nitrogen, helium, argon or carbon dioxide gas, or a reducing gas such as a hydrocarbon gas.

The whiskers may be mixed with the powder obtained by drying and pulverizing the aforesaid slurry instead of adding them to the slurry.

All of the molded catalysts obtained by the aforesaid methods are in a good molded condition, and their excellency is also demonstrated by the results of measuring their mechanical strengths.

(2) Supported catalysts

All known catalyst preparing methods involving the use of phosphorus-molybdenum or phosphorus-molybdenum-vanadium as a base can be applied to the preparation of supported catalysts. For example, to an aqueous solution prepared in advance of molybdophosphoric acid or molybdovanadophosphoric acid, an aqueous solution of compounds of the other required elements is added, and whiskers are added in a suitable amount to form a slurry. The slurry is then heated and sprayed onto, an ordinary spherical carrier material having a diameter of 3 to 5 mm in a rotating drum. The supported product is then heat-treated in the same way as described above for preparation of the molded catalysts. The catalyst preparing method involving the use of a nitrogen-containing heterocyclic organic compound described above may be used by providing the same step of removing the organic compound as described above.

The shape of the carrier is not limited to a sphere as described above, and it may be in the form of a solid cylinder, a hollow cylinder, broken fragments, a triangular pyramid, etc. Preferably, its size is 1 to 10 mm. The carrier may also be in the form of a honeycomb or pipe. The material for the carrier may be an ordinary carrier material for molding, such as silicon carbide, alumina, silica and silica-alumina. Supported catalysts so obtained are in a well supported condition and the yield of the catalytically active substance deposited on the carrier is very high. Their excellency is also demonstrated by the results of measuring their mechanical strengths.

By using whiskers in accordance with this invention, a compound containing a heteropolyacid as a base, of which molding has been considered difficult heretofore, can be molded as desired to produce a catalyst that can be industrially used. Furthermore, the use of whiskers has favorable effects (increased activity and alleviation of the buildup of heat in the catalyst bed) on the properties of the catalyst, and inhibits undesirable consecutive reactions and increases the selectivity of reaction.

The catalyst of this invention is useful for producing methacrylic acid by the catalytic vapor-phase reaction of methacrolein, isobutyraldehyde or isobutyric acid and molecular oxygen. Industrially, air is an advantageous source of oxygen. The reaction may be carried out in an inert gas such as nitrogen, carbon dioxide, helium, argon, carbon monoxide and steam as a diluent. Use of steam is particularly advantageous because it serves to inhibit formation of by-products.

In the reaction, the concentration of the starting materials in the feed gas is suitably in the range of 0.5 to 10% by volume; the suitable ratio of the volume of oxygen to that of the starting materials is from 0.5 to 10; and the suitable space velocity of the feed gas is in the range of 100 to 5000 hr$^{-1}$ (S. T. P.).

Generally, the catalyst of this invention is used in a reaction apparatus of the fixed bed type. But because of its very high mechanical strength, it can also be used satisfactorily in reaction apparatuses of the fluidized or moving bed type.

The following examples illustrate the preparation and testing of catalysts in accordance with this invention. The mechanical strengths of the molded catalysts and the supported catalysts were measured by the following methods.

(1) Extrusion-molded catalysts

Compressive strength

By using a "Kiya-type" hardness tester, a load is exerted on one particle of the catalyst in the direction of its longitudinal axis or in a direction at right angles to the longitudinal axis until cracking took place. The load upon cracking was measured (with a pelletized sample, the compressive strength was measured only in the direction of its longitudinal axis).

Degree of abrasion

Fifty grams of the catalyst was put in a cylinder made of a 12-mesh stainless steel wire gauze and having an inside diameter of 100 mm and a width of 100 mm. The cylinder was continuously rotated at a speed of 100 rpm for 30 minutes, and then the weight of the catalyst was measured. The ratio of abrasion was calculated in accordance with the following equation.

$$\text{Ratio of abrasion (\%)} = \frac{\text{Weight of the catalyst (50 g)} - \text{Weight (g) of the catalyst remaining in the gauze after rotation}}{\text{Weight of the catalyst (50 g)}} \times 100$$

Falling strength

Thirty grams of the catalyst was let fall from the upper portion of an upstanding iron pipe having an inside diameter of 25 mm and a length of 5000 mm, and received by a 4-mesh sieve. The weight of the catalyst remaining on the sieve was measured, and the falling strength ratio (%) was measured in accordance with the following equation.

$$\text{Falling strength ratio (\%)} = \frac{\text{Weight (g) of the catalyst remaining on the sieve}}{\text{Weight of the catalyst (30 g)}} \times 100$$

(2) Supported catalysts
Ratio of abrasion

The same measuring device as in the case of the molded catalysts above was used and rotated under the same conditions. The weight of the catalyst remaining in the cylinder was measured, and the ratio of abrasion was calculated in accordance with the following equation.

$$\text{Ratio of abrasion (\%)} = \frac{\text{Weight of the catalyst (50 g)} - \text{Weight (g) of the catalyst remaining in the wire gauze after rotation}}{\text{Weight of the catalyst (50 g)} - \text{Weight (g) of the carrier in the catalyst}} \times 100$$

Falling strength

The same measuring device as in the case of the molded catalysts above was used, and the catalyst was let fall under the same conditions. The weight of the catalyst remaining on the sieve was measured, and the falling strength ratio was calculated in accordance with the following equation.

$$\text{Falling strength ratio (\%)} = \frac{\text{Weight (g) of the catalyst remaining on the sieve} - \text{Weight (g) of the carrier in the catalyst}}{\text{Weight (30 g) of the catalyst} - \text{Weight (g) of the carrier in the catalyst}} \times 100$$

In the following Examples and Comparative Examples, the conversion, selectivity and one-pass yield are defined as follows:

$$\text{Conversion} = \frac{\text{Moles of the aldehyde or acid consumed}}{\text{Moles of the aldehyde or acid fed}} \times 100$$

$$\text{Selectivity (\%)} = \frac{\text{Moles of methacrylic acid or methacrolein formed}}{\text{Moles of the aldehyde or acid consumed}} \times 100$$

$$\text{One-pass yield (\%)} = \frac{\text{Moles of methacrylic acid formed}}{\text{Moles of the aldehyde or acid fed}} \times 100$$

In the following Examples and Comparative Examples, all pellets had a diameter of 5.5 mm and a length of 6 mm, and all rings had an outside diameter of 5.5 mm, an inside diameter of 2 mm and a length of 6 mm.

EXAMPLE 1

Ammonium paramolybdate (441.4 g) and 24.4 g of ammonium metavanadate were dissolved in 1000 ml of heated water, and the solution was stirred. A solution of 31.2 g of phosphoric acid (85% by weight) in 100 ml of water was added to the solution to form a slurry containing a phosphorus-molybdenum-vanadium compound. A solution of 40.6 g of cesium nitrate in 200 ml of water, and 9.5 g of silicon carbide whiskers (diameter 0.1 to 0.5 microns, length 10 to 100 microns) were added. The slurry was evaporated to dryness, and the resulting solid was pulverized to form a powder of a molding material. A small amount of water was added to the powder and well mixed. The mixture was pelletized by an extrusion molding machine, dried at 250° C., and calcined at 400° C. for 4 hours in an air current to obtain a catalytic oxide having the composition $P_{1.3}Mo_{12}V_1Cs_1$ in atomic ratio excepting oxygen (containing 2% by weight of the whiskers). The mechanical strengths of this catalyst were measured, and are shown in Table 1.

The catalyst (50 ml) was filled in a stainless steel U-shaped tube having an inside diameter of 25 mm, and immersed in a molten salt bath at 280° C. A starting gaseous mixture consisting of methacrolein, oxygen, nitrogen and water in a volume ratio of 1:5:34:10 was passed through the tube at a space velocity of 1000 $hr^{-1}$. The results of the reaction are shown in Table 1.

COMPARATIVE EXAMPLE 1

A catalyst was prepared in the same way as in Example 1 except that the silicon carbide whiskers was not used. The strengths of this catalyst were measured, and are shown in Table 2. This catalyst had a much worse molded condition than the catalyst of Example 1, and was far from satisfactory in practical applications.

The same reaction as in Example 1 was carried out using the resulting catalyst. The results are shown in Table 2.

EXAMPLE 2

A catalyst was prepared in the same way as in Example 1 except that the amount of the whiskers was changed to 23.8 g. The strengths of the catalyst were measured, and by using this catalyst, the same reaction as in Example 1 was carried out. The results are shown in Table 1.

EXAMPLE 3

A catalyst was prepared in the same way as in Example 2 except that the shape of the extrusion-molded catalyst was changed to a ring-like shape. The strengths of the catalyst were measured, and the same reaction as in Example 1 was carried out by using this catalyst. The results are shown in Table 1.

COMPARATIVE EXAMPLES 2 TO 4

In each run, a catalyst was prepared in the same way as in Example 1 except that the whiskers used in Example 1 were changed to the other fibers or fine powders shown in Table 2, and their amount was changed as shown in Table 2. The strengths of the catalysts were measured, and the same reaction as in Example 1 was carried out by using the resulting catalysts. The results are shown in Table 2.

These catalysts did not have satisfactory mechanical strength for use in industrial practice, and could not be molded into a ring-like shape.

EXAMPLE 4

Molybdenum trioxide (72.0 g), 3.79 g of vanadium pentoxide and 6.25 g of phosphoric acid (85% by weight) were added to 1000 ml of heated water, and the mixture was heated under reflux for 24 hours. The resulting reddish brown solution was filtered to remove a trace of an insoluble solid. While the solution was being stirred, a solution of 8.12 g of cesium nitrate in 50 ml of water was added to it at room temperature to obtain a yellow slurry of a heteropolyacid salt. Then, 7.2 g of potassium titanate whiskers (fiber diameter 0.2 to 0.5 micron, length 10 to 20 microns) were added, and mixed fully by a homomixer with stirring to obtain a slurry having a very high degree of emulsification. The slurry was then sprayed onto a silicon carbide carrier, 3 mm in diameter, fluidized at a temperature of 100° to 200° C. The carrier was then calcined at 400° C. in an air current to give a catalytic oxide of the composition $P_{1.3}Mo_{12}V_1Cs_1$ in atomic ratio excepting oxygen (containing 8% by weight of the whiskers based on the catalytic ingredient excepting the carrier). The amount of the catalytically active substance deposited on the carrier was 50 g/100 cc of carrier, and the yield of deposition was 77% by weight. The strengths of the resulting catalyst were measured, and by using this catalyst, the same reaction as in Example 1 was carried out. The results are shown in Table 1.

COMPARATIVE EXAMPLE 5

A catalyst was prepared in the same way as in Example 4 except that the whiskers were not added. The strengths of the catalyst measured are shown in Table 2. This catalyst underwent more abrasion and exfoliation than the catalyst of Example 4, and the yield of deposition was as low as 15% by weight. The catalytically active substance could be deposited only in an amount of 20 g/100 cc of carrier. The same reaction as in Example 1 was carried out using the resulting catalyst. The results are shown in Table 2.

COMPARATIVE EXAMPLE 6

A catalyst was prepared in the same way as in Example 4 except that silicon carbide whiskers (fiber diameter 4 to 10 microns, length 200 to 900 microns) were used instead of the potassium titanate whiskers. The strengths of the catalyst are shown in Table 2. During the catalyst preparation, the whiskers blocked up the spray nozzle (diameter 1 mm), and the spray could not be used continuously. The depositing operation, however, was continued by occasionally exchanging the nozzle. The yield of deposition was 33% by weight, and the amount of the catalytically active substance deposited was 25 g/100 cc of carrier. The same reaction as in Example 1 was carried out using this catalyst, and the results shown in Table 2 were obtained.

EXAMPLE 5

492.8 g of 12-molybdophosphoric acid was dissolved in 500 ml of water, and the solution was stirred at room temperature. A solution of 48.7 g of cesium nitrate and 5.0 g of copper nitrate in 200 ml of water, and 23.8 g of silicon nitride whiskers (0.2 to 0.5 microns in diameter and 50 to 300 microns in length) were added to the solution. The mixture was evaporated to dryness and pulverized to obtain a powder of a molding material. The powder was well mixed with a small amount of water, and the mixture was molded into rings by an extrusion molding machine. The rings were dried and then calcined in an air current at 370° C. for 4 hours to give a catalyst of the composition $P_1Mo_{12}Cs_{1.2}Cu_{0.1}$ in atomic ratio (containing 5% by weight of the whiskers). The mechanical strengths of the catalyst were measured, and the results are shown in Table 3. Using the resulting catalyst, the same reaction as in Example 1 was carried out except that the reaction temperature was changed to 320° C. The results shown in Table 3 were obtained.

COMPARATIVE EXAMPLE 7

A catalyst was prepared in the same way as in Example 5 except that the silicon nitride whiskers were not added. Using this catalyst, the same reaction as in Example 5 was carried out. The results are shown in Table 4.

EXAMPLE 6

Ammonium paramolybdate (441.4 g) and 18.3 g of ammonium metavanadate were dissolved in 1000 ml of heated water, and the solution was stirred. To the solution were added 100 g of pyridine and 31.2 g of phosphoric acid (85% by weight). Subsequently, 200 ml of nitric acid (specific gravity 1.38) and a solution of 21.4 g of rubidium hydroxide and 3.5 g of silver nitrate in 200 ml of water were added, and with stirring, 47.5 g of potassium titanate whiskers (0.2 to 0.5 microns in diameter and 10 to 100 microns in length) were added. The mixture was concentrated by heating. The clay-like material obtained was dried, pulverized, mixed well with a small amount of water, and molded into rings by an extrusion-molding machine. The rings were dried at 250° C., and then calcined in a nitrogen atmosphere at 450° C. for 4 hours and subsequently in an air current at 400° C. for 2 hours to give a catalytic oxide of the composition $P_{1.3}Mo_{12}V_{0.75}Rb_{1.0}Ag_{0.1}$ in atomic ratio excepting oxygen (containing 10% by weight of the whiskers). The mechanical strengths of the catalyst were measured, and by using this catalyst, the same reaction as in Example 1 was carried out except that the reaction temperature was changed to 290° C. The results are shown in Table 3.

EXAMPLE 7

A catalyst having the composition $P_{1.3}Mo_{12}V_1Cs_{1.2}Ag_{0.1}$ in atomic ratio excepting oxygen was prepared in the same way as in Example 6 except that the amount of the ammonium metavanadate was changed to 24.4 g, 48.7 g of cesium nitrate was used instead of 21.4 g of rubidium hydroxide, 33.3 g of the same silicon carbide whiskers as used in Example 1 were used instead of 47.5 g of the potassium titanate whiskers, and the form of the catalyst was changed to pellets. The catalyst contained 7% by weight of the whiskers. The mechanical strengths of the catalyst were measured, and by using the catalyst, the same reaction as in Example 1 was carried out. The results are shown in Table 3.

EXAMPLE 8

A catalyst was prepared in the same way as in Example 7 except that the shape of the catalyst was changed to a ring-like shape. The strengths of the catalyst were measured, and by using this catalyst, the same reaction as in Example 1 was carried out. The results are shown in Table 3.

COMPARATIVE EXAMPLE 8

A catalyst was prepared in the same way as in Example 8 except that the silicon carbide whiskers were not used. Various data of this catalyst are shown in Table 4.

COMPARATIVE EXAMPLE 9

A catalyst was prepared in the same way as in Example 8 except that fumed silica (Aerosil, 10 to 40 microns)

was used instead of the silicon carbide whiskers. Various data of this catalyst are shown in Table 4.

EXAMPLE 9

Ammonium paramolybdate (88.3 g) and 4.88 g of ammonium metavanadate were dissolved in 400 ml of heated water, and the solution was stirred. Pyridine (20 g) and 6.25 g of phosphoric acid (85% by weight) were added to the solution, and subsequently 40 ml of nitric acid (specific gravity 1.38) and a solution of 14.62 g of cesium nitrate and 2.01 g of copper nitrate in 50 ml of water were added to form a yellow slurry. Then, 4.55 g of silicon carbide whiskers (fiber diameter 0.1 to 0.5 microns, length 10 to 100 microns) were added to the slurry and mixed well by a homomixer with stirring. The slurry was then sprayed onto a silicon carbide carrier, 3 mm in diameter, fluidized at a temperature of 100° to 200° C., and dried at 250° C. The dried product was then calcined in a stream of nitrogen at 450° C. for 4 hours and then in an air stream at 400° C. for 2 hours to give a catalyst of the composition $P_{1.3}Mo_{12}V_1Cs_{1.8}Cu_{0.2}$ in atomic ratio excepting oxygen (containing 5% of the whiskers based on the catalyst ingredients excepting the carrier). The amount of the catalytically active substance deposited on the carrier was 56 g/100 cc of carrier, and the yield of deposition was 82% by weight. The strengths of the catalyst were measured, and by using this catalyst, the same reaction as in Example 1 was carried out except that the reaction temperature was changed to 300° C. The results are shown in Table 3.

COMPARATIVE EXAMPLE 10

A catalyst was prepared in the same way as in Example 9 except that the whiskers were not used. The strengths of this catalyst were measured, and the results are shown in Table 4. This catalyst underwent more abrasion and exfoliation than the catalyst of Example 9, and the yield of deposition was as low as 34% by weight. The amount of the catalytically active material deposited was as small as 28 g/100 cc of carrier. Using the resulting catalyst, the same reaction as in Example 1 was carried out except that the reaction temperature was changed to 300° C. The results are shown in Table 4.

EXAMPLE 10

A ring-shaped catalyst of the composition $P_{1.3}Mo_{12}V_{1.5}Cs_{1.2}Ag_{0.2}$ in atomic ratio excepting oxygen was prepared in the same way as in Example 7 except that the amount of the ammonium metavanadate was changed to 36.6 g, the amount of silver nitrate was changed to 7.1 g, and the amount of the silicon carbide whiskers was changed to 71.4 g. The mechanical strengths of the catalyst were measured, and the results are shown in Table 5. Using this catalyst, the same reaction as in Example 1 was carried out except that methacrolein was changed to isobutyraldehyde. The results are shown in Table 5.

COMPARATIVE EXAMPLE 11

A catalyst was prepared in the same way as in Example 10 except that the silicon carbide whiskers were not used. The mechnanical strengths of the catalyst were measured, and by using this catalyst, the same reaction as in Example 10 was carried out. The results are shown in Table 5.

EXAMPLE 11

Ammonium paramolybdate (441.4 g) and 30.5 g of ammonium metavanadate were dissolved in 1000 ml of heated water, and the solution was stirred. Pyridine (100 g) and 36.0 g of phosphoric acid (85% by weight) were added to the solution. Subsequently, 200 ml of nitric acid (specific gravity 1.38), a solution of 40.6 g of cesium nitrate, 8.8 g of strontium nitrate and 10.1 g of copper nitrate in 200 ml of water, and 15.2 g of antimony trioxide were added to the solution, and with stirring, the mixture was concentrated by heating. The resulting clay-like material was dried and pulverized, and the powder was fully mixed with 71.4 g of the same silicon nitride whiskers as used in Example 5 and a small amount of water. The mixture was molded into rings by an extrusion molding machine. The rings were dried at 250° C., and calcined in a nitrogen stream at 450° C. for 4 hours and subsequently in an air stream at 400° C. for 2 hours to give a catalyst of the composition $P_{1.5}Mo_{12}V_{1.25}Cs_{1.0}Sr_{0.2}Cu_{0.2}Sb_{0.5}$ in atomic ratio excepting oxygen (containing 15% by weight of the whiskers).

The mechanical strengths of the catalyst were measured, and the results are shown in Table 5.

The catalyst (50 ml) was filled in a stainless steel U-shaped tube having an inside diameter of 25 mm. The tube was immersed in a molten salt bath at 270° C., and a starting gaseous mixture composed of isobutyric acid, oxygen, nitrogen and water in a volume ratio of 2:3:90:5 was passed through the tube at a space velocity of 2000 $hr^{-1}$. The results of the reaction are shown in Table 5.

COMPARATIVE EXAMPLE 12

A catalyst was prepared in the same way as in Example 11 except that the silicon nitride whiskers were not used. The mechanical strengths of this catalyst were measured, and by using this catalyst, the same oxidation reaction as in Example 11 was carried out. The results are shown in Table 5.

EXAMPLE 12

The same oxidation reaction of isobutyric acid as in Example 11 was carried out except that the catalyst obtained in Example 9 was used and the reaction temperature was changed to 290° C. The results are shown in Table 5.

COMPARATIVE EXAMPLE 13

The same reaction as in Example 11 was carried out except that the catalyst obtained in Comparative Example 10 was used and the reaction temperature was changed to 290° C. The results are shown in Table 5.

TABLE 1

| Example | | 1 | 2 | 3 | 4 |
|---|---|---|---|---|---|
| Catalyst composition (atomic ratio) | P | 1.3 | 1.3 | 1.3 | 1.3 |
| | Mo | 12 | 12 | 12 | 12 |
| | V | 1 | 1 | 1 | 1 |
| | X | Cs = 1 | Cs = 1 | Cs = 1 | Cs = 1 |
| Type of whiskers | | Silicon carbide (0.1–0.5 μmφ × 10–100 μmL) | | | Potassium titanate (0.2–0.5 μmφ × 10–20 μmL) |
| Content of the whiskers (wt. % based on the catalyst) | | 2 | 5 | 5 | 8 |
| Shape of the | | Pellet | Pellet | Ring | Spherical, |

TABLE 1-continued

| Example | 1 | 2 | 3 | 4 |
|---|---|---|---|---|
| catalyst |  |  |  | supported |
| Mechanical strength |  |  |  |  |
| Compressive strength (kg/pellet) | 3.7 | 4.6 | 4.1/2.3* | — |
| Ratio of abrasion (%) | 5.1 | 2.4 | 3.5 | 3.2 |
| Falling strength (%) | 96.5 | 99.0 | 97.7 | 96.9 |
| Reaction temperature (°C.) | 280 | 280 | 280 | 310 |
| Conversion (mole %) | 88.3 | 87.7 | 88.5 | 84.7 |
| Selectivity for methacrylic acid (mole %) | 74.5 | 74.6 | 76.8 | 75.3 |
| One-pass yield of methacrylic acid (mole %) | 65.8 | 65.4 | 68.0 | 63.8 |

*long axis direction/direction at right angles to the long axis
: Content based on the catalytic substance deposited
φ: diameter
L: Length

TABLE 2

| Comparative Example |  | 1 | 2 | 3 |
|---|---|---|---|---|
| Catalyst composition (atomic ratio) | P | 1.3 | 1.3 | 1.3 |
|  | Mo | 12 | 12 | 12 |
|  | V | 1 | 1 | 1 |
|  | X | Cs = 1 | Cs = 1 | Cs = 1 |
| Type of fibers and fine powder |  | None | Glass fibers 8–12 μmφ × 2000 μmL | Fine SiC powder (0.3 μmφ) |
| Content of whiskers (wt. % based on the catalyst) |  | 0 | 3 | 5 |
| Shape of the catalyst |  | Pellet | Pellet | Pellet |
| Mechanical strength |  |  |  |  |
| Compressive strength (kg/pellet) |  | 0.4 | 1.3 | 1.0 |
| Ratio of abrasion (%) |  | 50.8 | 37.2 | 40.6 |
| Falling strength (%) |  | 54.4 | 76.8 | 66.1 |
| Reaction temperature (°C.) |  | 280 | 280 | 280 |
| Conversion (mole %) |  | 86.4 | 86.0 | 85.7 |
| Selectivity for methacrylic acid (mole %) |  | 73.9 | 73.7 | 74.1 |
| One-pass yield of methacrylic acid (mole %) |  | 63.8 | 63.4 | 63.5 |

| Comparative Example |  | 4 | 5 | 6 |
|---|---|---|---|---|
| Catalyst composition (atomic ratio) | P | 1.3 | 1.3 | 1.3 |
|  | Mo | 12 | 12 | 12 |
|  | V | 1 | 1 | 1 |
|  | X | Cs = 1 | Cs = 1 | Cs = 1 |
| Type of fibers and fine powder |  | Silicon carbide fiber (10–15 μmφ × 3000 μmL) | None | Silicone carbide (4–10 μmφ) × 200–900 μmL |
| Content of whiskers (wt. % based on the catalyst) |  | 3 | 0 | 8 |
| Shape of the catalyst |  | Pellet | Spherical, supported | Spherical, supported |
| Mechanical strength |  |  |  |  |
| Compressive strength (kg/pellet) |  | 1.1 | — | — |
| Ratio of abrasion (%) |  | 46.9 | 58.5 | 38.4 |
| Falling strength (%) |  | 78.1 | 40.3 | 55.7 |
| Reaction temperature (°C.) |  | 280 | 310 | 310 |
| Conversion (mole %) |  | 85.9 | 71.0 | 79.5 |
| Selectivity for methacrylic acid (mole %) |  | 73.3 | 73.2 | 73.7 |
| One-pass yield of methacrylic acid (mole %) |  | 63.0 | 52.0 | 58.6 |

, φ and L:
Same as the footnote to Table 1.

TABLE 3

| Example |  | 5 | 6 | 7 |
|---|---|---|---|---|
| Catalyst Composition (atomic ratio) | P | 1 | 1.3 | 1.3 |
|  | Mo | 12 | 12 | 12 |
|  | V | 0 | 0.75 | 1 |
|  | X | Cs = 1.2 | Rb = 1 | Cs = 1.2 |
|  | Y | Cu = 0.1 | Ag = 0.1 | Ag = 0.1 |
| Type of whiskers |  | Silicon nitride (0.2–0.5 μmφ × 50–300 μmL) | Potassium titanate (0.2–0.5 μmφ × 10–100 μmL) | Silicone carbide |
| Content of whiskers (wt. % based on the catalyst) |  | 5 | 10 | 7 |
| Shape of the catalyst |  | Ring | Ring | Pellet |
| Mechanical strength |  |  |  |  |
| Compressive strength (kg/pellet) |  | 4.3/1.8* | 5.2/2.6* | 5.4 |
| Ratio of abrasion (%) |  | 4.0 | 0.6 | 0.8 |
| Falling strength (%) |  | 97.1 | 99.4 | 99.6 |
| Reaction temperature (°C.) |  | 320 | 290 | 280 |
| Conversion (mole %) |  | 79.3 | 90.4 | 92.3 |
| Selectivity for methacrylic acid (mole %) |  | 70.8 | 86.4 | 87.7 |
| One-pass yield of methacrylic acid (mole %) |  | 56.1 | 78.1 | 80.9 |

| Example |  | 8 | 9 |
|---|---|---|---|
| Catalyst composition (atomic ratio) | P | 1.3 | 1.3 |
|  | Mo | 12 | 12 |
|  | V | 1 | 1 |
|  | X | Cs = 1.2 | Cs = 1.8 |

TABLE 3-continued

|  | Y | Ag = 0.1 | Cu = 0.2 |
|---|---|---|---|
| Type of whiskers |  | Silicon carbide | Silicone carbide |
| Content of whiskers (wt. % based on the catalyst) |  | 7 | 5 |
| Shape of the catalyst |  | Ring | Spherical, supported |
| Mechanical strength |  |  |  |
| Compressive strength (kg/pellet) |  | 4.9/2.7* | — |
| Ratio of abrasion (%) |  | 1.1 | 2.0 |
| Falling strength (%) |  | 99.0 | 98.2 |
| Reaction temperature (°C.) |  | 280 | 300 |
| Conversion (mole %) |  | 92.6 | 90.6 |
| Selectivity for methacrylic acid (mole %) |  | 88.8 | 88.4 |
| One-pass yield of methacrylic acid (mole %) |  | 82.2 | 80.1 |

*, $\phi$ and L are the same as the footnote to Table 1.

TABLE 4

| Comparative Example |  | 7 | 8 | 9 | 10 |
|---|---|---|---|---|---|
| Catalyst composition (atomic ratio) | P | 1 | 1.3 | 1.3 | 1.3 |
|  | Mo | 12 | 12 | 12 | 12 |
|  | V | 0 | 1 | 1 | 1 |
|  | X | Cs = 1.2 | Cs = 1.2 | Cs = 1.2 | Cs = 1.8 |
|  | Y | Cu = 0.1 | Ag = 0.1 | Ag = 0.1 | Cu = 0.2 |
| Type of whiskers and fine powder |  | None | None | Fumed silica (10–40 μm) | None |
| Content of the whiskers (wt. % based on the catalyst) |  | 0 | 0 | 7 | 0 |
| Shape of the catalyst |  | Pellet | Ring | Ring | Spherical, supported |
| Mechanical strength |  |  |  |  |  |
| Compressive strength (kg/pellet) |  | 0.5 | 2.9/1.0* | 3.1/1.2* | — |
| Ratio of abrasion (%) |  | 59.1 | 18.5 | 14.2 | 28.2 |
| Falling strength (%) |  | 48.2 | 86.7 | 88.9 | 70.1 |
| Reaction temperature (°C.) |  | 320 | 280 | 280 | 300 |
| Conversion (mole %) |  | 76.4 | 91.5 | 88.7 | 86.4 |
| Selectivity for methacrylic acid (mole %) |  | 68.2 | 87.0 | 76.5 | 86.8 |
| One-pass yield of methacrylic acid (mole %) |  | 52.1 | 79.6 | 67.9 | 75.0 |

*, $\phi$ and L are the same as the footnote to Table 1.

TABLE 5

| Example (Ex.) or Comparative Example (CEx.) |  | Ex. 10 | CEx. 11 | Ex. 11 |
|---|---|---|---|---|
| Catalyst Composition (atomic ratio) | P | 1.3 | 1.3 | 1.5 |
|  | Mo | 12 | 12 | 12 |
|  | V | 1.5 | 1.5 | 1.25 |
|  | X | Cs = 1.2 | Cs = 1.2 | Cs = 1.0 Sr = 0.2 |
|  | Y | Ag = 0.2 | Ag = 0.2 | Cu = 0.2 Sb = 0.5 |
| Type of whiskers |  | Silicon nitride | None | Silicone nitride |
| Content of the whiskers (wt. % based on the catalyst) |  | 15 | 0 | 15 |
| Shape of the catalyst |  | Ring | Ring | Ring |
| Mechanical strength |  |  |  |  |
| Compressive strength (kg/pellet) |  | 6.3/2.8* | 2.8/0.8* | 5.9/2.9* |
| Ratio of abrasion (%) |  | 0.4 | 16.7 | 0.5 |
| Falling strength (%) |  | 99.8 | 84.5 | 99.7 |
| Reaction temperature (°C.) |  | 280 | 280 | 270 |
| Conversion (mole %) |  | Isobutyr- aldehyde 100 | Isobutyr- aldehyde 100 | Isobutyric acid 100 |
| Selectivity for methacrylic acid (mole %) |  | 73.6 | 69.8 | 76.8 |
| Selectivity for methacrolein (mole %) |  | 9.5 | 9.0 | — |

| Example (Ex.) or Comparative Example (CEx.) |  | CEx. 12 | Ex. 12 | CEx. 13 |
|---|---|---|---|---|
| Catalyst composition (atomic ratio) | P | 1.5 | 1.3 | 1.3 |
|  | Mo | 12 | 12 | 12 |
|  | V | 1.25 | 1 | 1 |
|  | X | Cs = 1.0 Sr = 0.2 | Cs = 1.8 | Cs = 1.8 |
|  | Y | Cu = 0.2 Sb = 0.5 | Cu = 0.2 | Cu = 0.2 |
| Type of whiskers |  | None | Silicon carbide | None |
| Content of the whiskers (wt. % based on the catalyst) |  | 0 | 5 | 0 |
| Shape of the catalyst |  | Ring | Spherical, supported | Spherical, supported |
| Mechanical strength |  |  |  |  |
| Compressive strength (kg/pellet) |  | 2.6/1.1* | — | — |
| Ratio of abrasion (%) |  | 18.6 | — | — |
| Falling strength (%) |  | 86.0 | — | — |
| Reaction temperature (°C.) |  | 270 | 290 | 290 |
| Conversion (mole %) |  | Isobutyric acid 100 | Isobutyric acid 100 | Isobutyric acid 100 |
| Selectivity for methacrylic acid (mole %) |  | 73.5 | 72.7 | 68.0 |
| Selectivity for methacrolein |  | — | — | — |

What is claimed is:

1. A catalyst composition having excellent mechanical strength consisting essentially of a compound containing a heteropolyacid aa a base and from about 1 to about 50% by weight of the catalyst composition of whiskers having an average diameter of not more than 5 microns and an average length of not more than 1000 microns.

2. The catalyst composition of claim 1 which is in the form of a compression-molded article.

3. The catalyst composition of claim 1 which is in a form supported on a carrier.

4. The catalyst composition of claim 1 wherein the compound containing a heteropolyacid as a base is molybdophosphoric acid or molybdovanadophosphoric acid.

5. The catalyst composition of claim 1 wherein the whiskers have an average diameter of not more than 1 micron and an average length of not more than 500 microns.

6. The catalyst composition of claim 4 wherein the compound containing a heteropolyacid as a base has the following formula $$P_a Mo_b V_c X_d Y_e O_f$$

wherein P represents phosphorus, Mo represents molybdenum, V represents vanadium, X represents at least one element selected from the group consisting of alkali metals and alkaline earth metals, Y represents at least one element selected from the group consisting of copper, silver, arsenic, antimony, tellurium, cobalt, bismuth, tungsten and zirconium, and O represents oxygen; and wherein the subscripts a, b, c, d, e and f represent the atomic ratios of the elements, and when b is 12, a is 0.1 to 3.0, c is 0 to 6.0, d is 0.05 to 5.0, e is 0.01 to 5.0, and f is a number determined by the atomic numbers and atomic ratios of the individual elements.

7. The catalyst composition of claim 6 wherein in the formula heteropolyacid a is 0.5 to 1.5, c is 0.1 to 2.5, d is 0.1 to 2.0, e is 0.05 to 2.0.

8. The catalyst composition of claim 1 wherein the whiskers comprise tungsten, iron, nickel, silicon carbide, boron carbide, titanium carbide, silicon nitride, silicon-aluminua, alumina, titanium oxide, beryllium oxide, potassium titanate, or calcium phosphate.

* * * * *